United States Patent
Hsueh et al.

(10) Patent No.: US 7,710,230 B2
(45) Date of Patent: May 4, 2010

(54) TRANSFORMER OF LIGHT TUBE DRIVING DEVICE AND METHOD FOR ADJUSTING LIGHT TUBE USING THEREOF

(75) Inventors: Ching-Fu Hsueh, Bade (TW); Wan-Chin Hsu, Taoyuan County (TW)

(73) Assignee: Darfon Electronics Corp., Taoyuan (TW)

( * ) Notice: Subject to any disclaimer, the term of this patent is extended or adjusted under 35 U.S.C. 154(b) by 780 days.

(21) Appl. No.: 11/528,668

(22) Filed: Sep. 28, 2006

(65) Prior Publication Data
US 2007/0075821 A1 Apr. 5, 2007

(30) Foreign Application Priority Data
Oct. 4, 2005 (TW) .............................. 94134730 A

(51) Int. Cl.
*H01F 27/02* (2006.01)
*H01F 27/30* (2006.01)
*H01F 21/02* (2006.01)

(52) U.S. Cl. .................... 336/92; 336/198; 336/208; 336/145

(58) Field of Classification Search .................. 336/90, 336/170, 198, 212
See application file for complete search history.

(56) References Cited

U.S. PATENT DOCUMENTS 3,154,756 A * 10/1964 Bojarski ..................... 336/133
4,910,482 A * 3/1990 Takagai et al. .............. 333/181
4,916,424 A * 4/1990 Kijima ....................... 336/160
6,414,582 B1 7/2002 Brkovic et al.
6,611,190 B2 * 8/2003 Chui et al. .................. 336/198
6,876,161 B2 4/2005 Chung
2005/0073385 A1* 4/2005 Wu et al. .................... 336/208

FOREIGN PATENT DOCUMENTS

| JP | 2004-335422 | 11/2004 |
|---|---|---|
| KR | 10-2005-0017030 | 2/2005 |
| TW | 507224 | 10/2002 |
| TW | 594808 | 6/2004 |
| TW | I220994 | 9/2004 |
| TW | I223287 | 11/2004 |

* cited by examiner

*Primary Examiner*—Elvin G Enad
*Assistant Examiner*—Tszfung Chan
(74) *Attorney, Agent, or Firm*—Rabin & Berdo, PC

(57) ABSTRACT

A transformer including an insulating housing, a first bobbin, a primary coil, a second bobbin, a secondary coil, a first core and a second core is provided. The insulating housing has a first chamber and a second chamber separated from the first chamber, wherein two apertures of the first chamber and the second chamber are respectively disposed on two opposite side-walls of the insulating housing. The first bobbin has a first through hole disposed in the first chamber. The primary coil is surrounded on the first bobbin. The second bobbin has a second through hole disposed in the second chamber. The secondary coil is surrounded on the second bobbin. The first core is inserted to the first through hole and the second through hole. The first core and the second core are coupled together to form a magnetic loop.

6 Claims, 8 Drawing Sheets

TRANSFORMER OF LIGHT TUBE DRIVING DEVICE AND METHOD FOR ADJUSTING LIGHT TUBE USING THEREOF

This application claims the benefit of Taiwan application Serial No. 094134730, filed Oct. 4, 2005, the subject matter of which is incorporated herein by reference.

BACKGROUND OF THE INVENTION

1. Field of the Invention

The invention relates in general to a light tube driving device, and more particularly to a transformer of a light tube driving device.

2. Description of the Related Art

With the popularity of multi-media products, the application of liquid crystal display (LCD) in computer and TV is also becoming more and more popular. Generally speaking, the liquid crystal display uses a compact and high-efficient discharging light tube as the light source of a backlight module, and features thin thickness, high resolution and steady display quality.

The backlight module of a liquid crystal display is mainly composed of a discharging light tube such as a cold cathode fluorescent lamp (CCFL) and a transformer used for driving the cold cathode fluorescent lamp. Referring to FIG. 1, an exploded diagram of a conventional transformer is shown. The transformer 10 has a bobbin 11, a first core 13, a second core 15, a primary coil set 17 and a secondary coil set 19. After the transformer 10 is supplied with an electric current, a magnetic flux flows from a first end 15a of the second core 15 to a second end 15b, and flows through the first core 13 and returns to the second core 15.

However, since the voltage difference between the primary coil set and the secondary coil set is large, spark would easily occur between the coil on the primary coil set and the coil on the secondary coil set. Moreover, the stray capacitance effect easily occurs between the housing of the cold cathode fluorescent lamp and housing of the liquid crystal display. The stray capacitance effect will cause different CCFLs of an LCD to have different currents, hence affecting the stability of currents. When the currents flowing through a CCFL differs from one another, different CCFLs would have different luminance levels. Consequently, the luminance of the backlight module is non-uniformed. Moreover, a CCFL with higher luminance will have shorter lifespan. In order to achieve the stability of currents, a high voltage capacitor is disposed between each of the CCFLs and the secondary coil to reduce stray capacitance effect, such that the current difference between different CCFLs is reduced. However, the use of several high voltage capacitors is costive.

SUMMARY OF THE INVENTION

It is therefore an object of the invention to provide a transformer capable of increasing the safety insulation distance between the primary coil set and the secondary coil set and improving the spark problem. Moreover, the disposition of an external magnetic element not only increases total magnetic flux and reduces electromagnetic interference, but also balances induced current and adjusts light tube luminance.

The invention achieves the above-identified object by providing a transformer includes an insulating housing, a first bobbin, a primary coil, a second bobbin, a secondary coil, a first core and a second core. The insulating housing has a first chamber and a second chamber separated from the first chamber, wherein the apertures of the first chamber and the second chamber are respectively disposed on two opposite side-walls of the insulating housing. The first bobbin has a first through hole disposed on the first chamber. The primary coil is surrounded on the first bobbin. The second bobbin has a second through hole disposed on the second chamber. The secondary coil surrounded on the second bobbin. The first core is inserted to the first through hole and the second through hole. The first core and the second core are coupled together to form a magnetic loop.

The invention achieves another object by providing a light tube driving device. The device includes a driving circuit, a first light tube and a transformer. The driving circuit is used for outputting an AC voltage. The transformer is used for receiving the AC voltage to drive the first light tube. The transformer includes an insulating housing, a first bobbin, a primary coil, a second bobbin, a secondary coil, a first core and a second core. The insulating housing has a first chamber and a second chamber separated from the first chamber, wherein the apertures of the first chamber and the second chamber are respectively disposed on two opposite side-walls of the insulating housing. The first bobbin has a first through hole disposed on the first chamber. The second bobbin has a second through hole disposed on the second chamber. The first core is inserted to the first through hole and the second through hole. The first core and the second core are coupled together to form a magnetic loop. The primary coil is surrounded on the first bobbin, and is coupled to the driving circuit to receive the AC voltage. The secondary coil is surrounded on the second bobbin, and is coupled to the first light tube to drive the first light tube.

The invention achieves another object by providing a method for adjusting light tube luminance. The method includes the following steps: Step (a), a transformer, a first light tube and a second light tube are provided, wherein the transformer includes an insulating housing, a first bobbin, a primary coil, a second bobbin, a secondary coil, a first core and a second core. The insulating housing has a first chamber and a second chamber separated from the first chamber, wherein the apertures of the first chamber and the second chamber are respectively disposed on two opposite side-walls of the insulating housing. The first bobbin has a first through hole disposed on the first chamber. The second bobbin has a second through hole disposed on the second chamber. The first core is inserted to the first through hole and the second through hole. The first core and the second core are coupled together to form a magnetic loop. The primary coil is surrounded on the first bobbin. The first secondary coil is surrounded on the second bobbin, and is coupled to the first light tube. The second secondary coil is surrounded on the second bobbin, separated from the first secondary coil by a predetermined distance, and coupled to the second light tube. The first external magnetic element is disposed next to the first bobbin. The second external magnetic element is disposed next to the second bobbin. Step (b), a driving circuit is provided, wherein the driving circuit is used for outputting an AC voltage to the primary coil to drive the first light tube and the second light tube. Step (c), the position of the second external magnetic element is adjusted such that the luminance of the first light tube and the luminance of the second light tube are adjusted accordingly.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides a transformer with a re-designed insulating housing for carrying coils. Under the same size, the transformer of the invention not only increases the safety insulation distance between the pins of the primary coil and the pins of the secondary coil, but also improves the spark problem. The invention is exemplified by the embodiments disclosed below. However, the following disclosure is only for the purpose of elaboration not to limit the scope of protection. The scope of protection of the invention is defined in the appended claims.

First Embodiment

Figure 1:
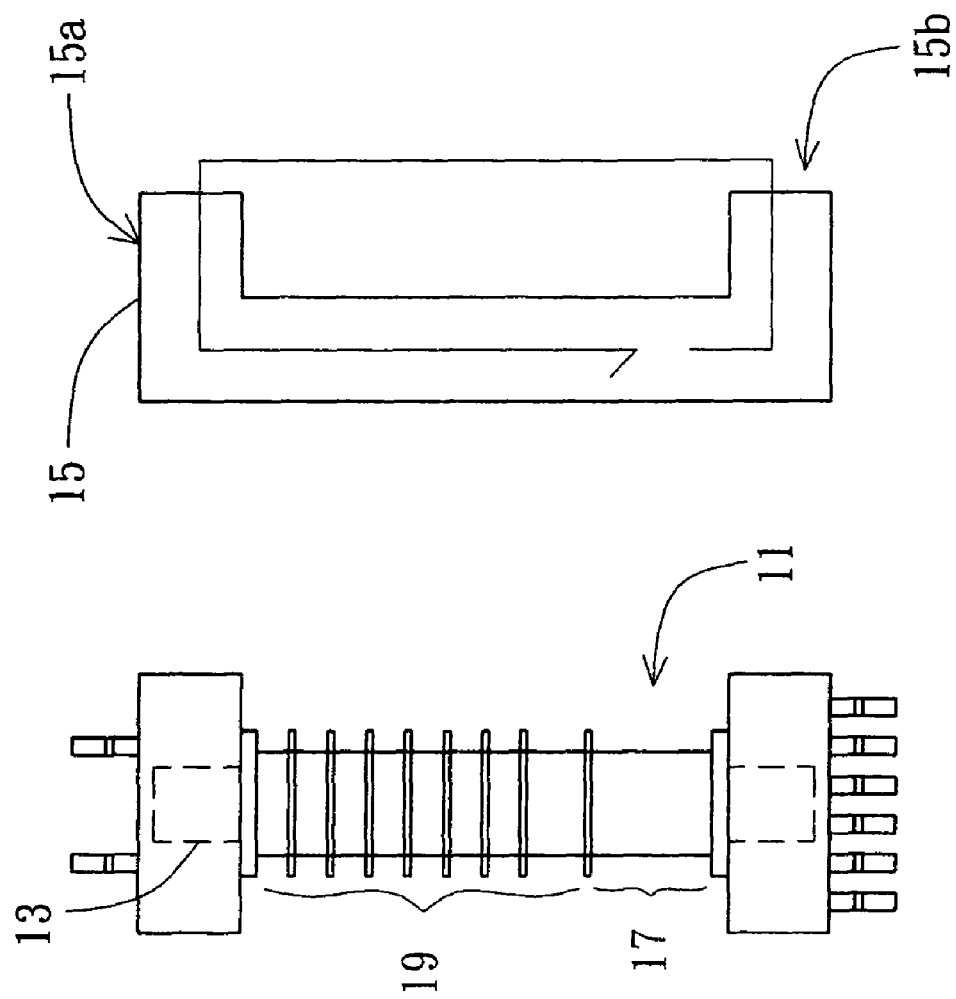
FIG. 1 is an exploded diagram of a conventional transformer.
Figure 2:
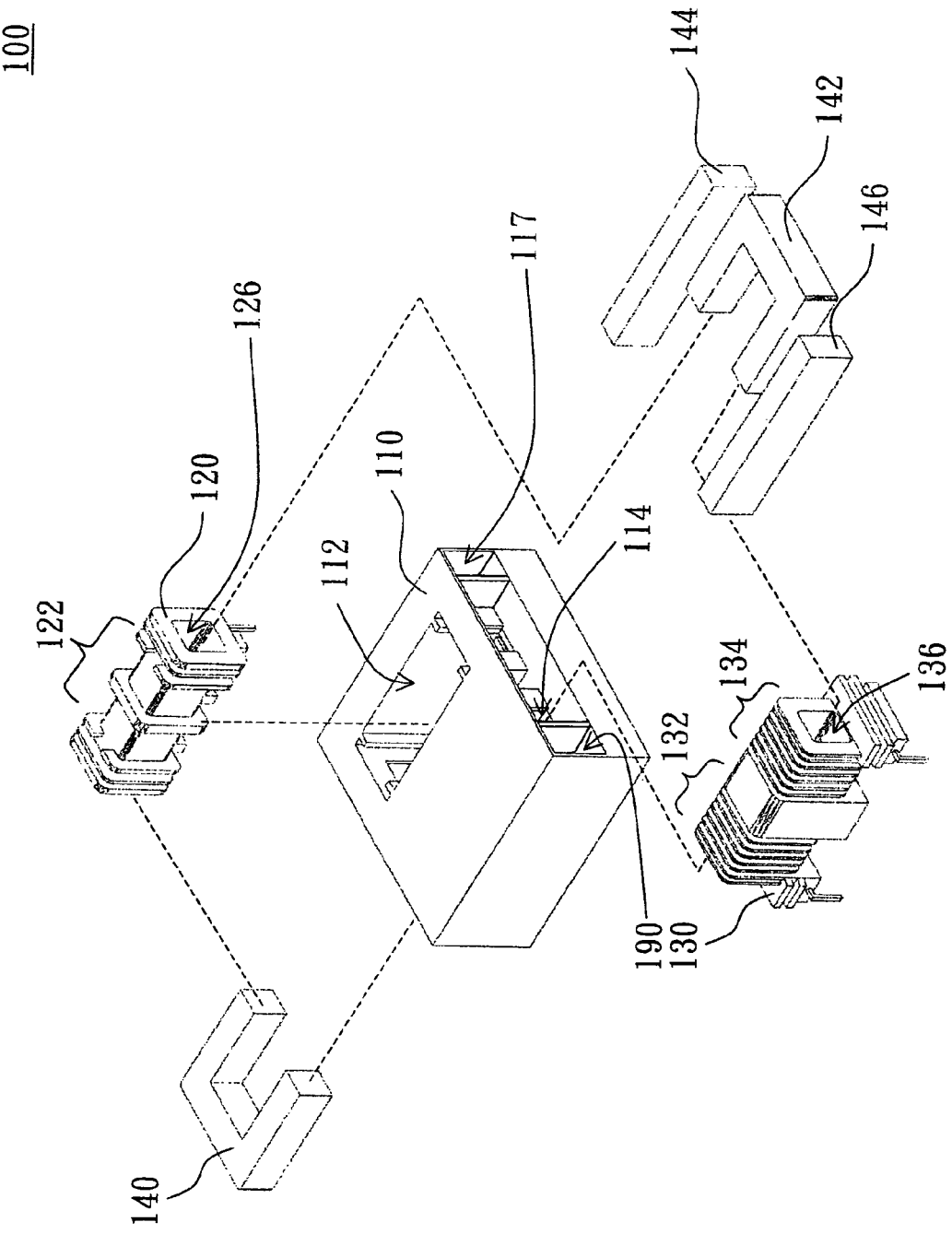
FIG. 2 is an exploded diagram of a transformer according to a first embodiment of the invention.

Referring to FIG. 2, an exploded diagram of a transformer according to a first embodiment of the invention is shown. The transformer 100 of the present embodiment of the invention includes an insulating housing 110, a first bobbin 120, a primary coil 122, a second bobbin 130, a secondary coil 132, a first core 140 and a second core 142. The first bobbin 120 has a first through hole 126. The primary coil 122 is on and surrounds the first bobbin 120. The second bobbin 130 has a second through hole 136. The secondary coil 132 is on and surrounds the second bobbin 130.

Figure 3:
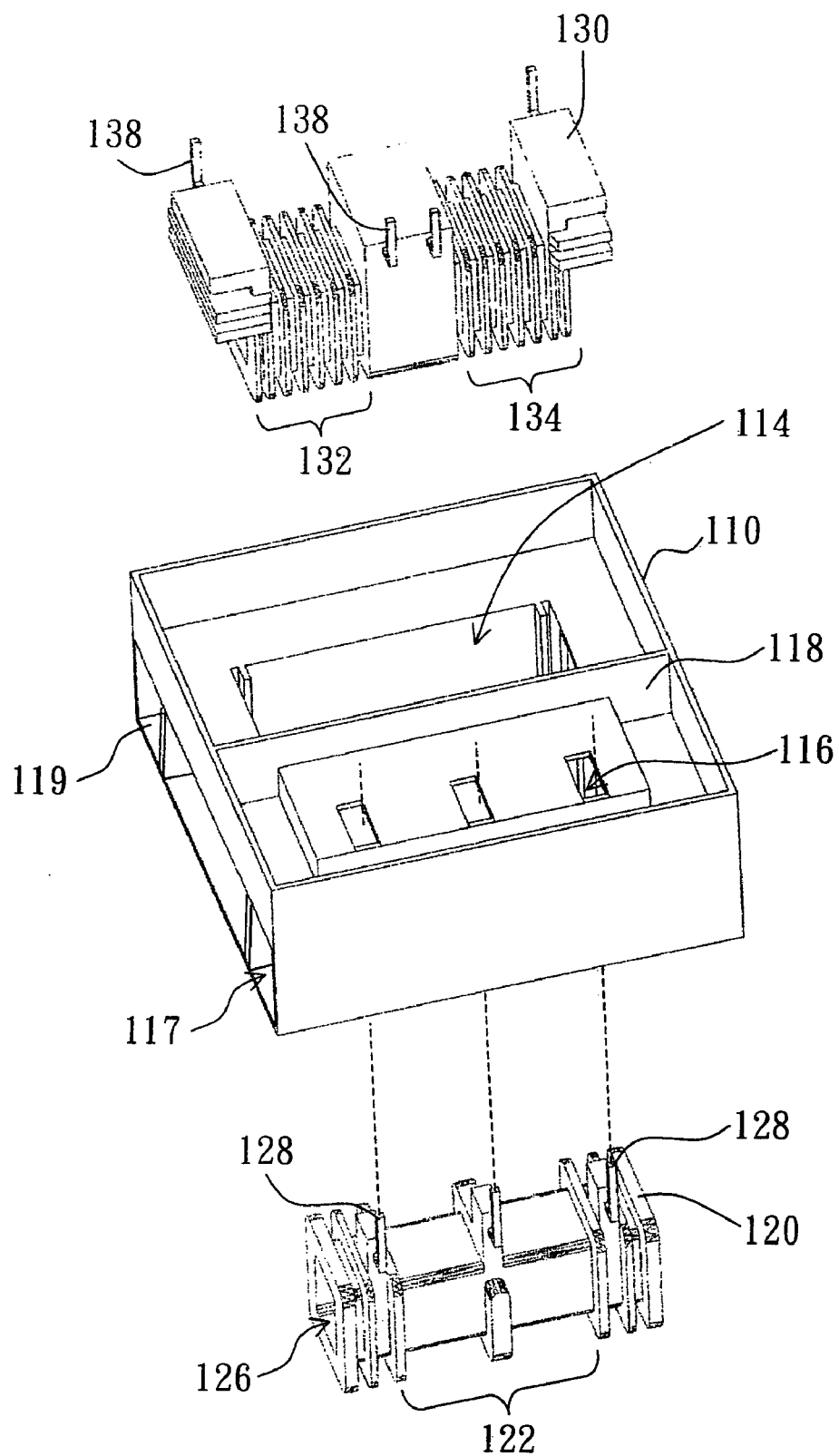
FIG. 3 is an upward view of an insulating housing, a first bobbin and a second bobbin of FIG. 2.

FIG. 3 is an upward view of an insulating housing, a first bobbin and a second bobbin of FIG. 2. Referring to both FIG. 2 and FIG. 3. The insulating housing 110 has a first chamber 112 and a second chamber 114 separated from the first chamber 112, wherein the apertures of the first chamber 112 and the second chamber 114 are respectively disposed on two opposite side-walls of the insulating housing 110, for example, the top surface and the bottom surface of the insulating housing. Referring to FIG. 3, the insulating housing 110 preferably further includes a divider 118 extended from the insulating housing 110 disposed between the first chamber 112 and the second chamber 114. On the other hand, the first chamber 112 preferably has an aperture 116 positioned on the same side of the insulating housing 110 with the aperture of the second chamber 114. For example, the aperture 116 is positioned on the bottom surface of the insulating housing and is away from the divider 118.

Moreover, the transformer 100 further includes a first pin set 128 and a second pin set 138. The first pin set 128 is extended from two ends of the primary coil 122 and is corresponding to the aperture 116. The second pin set 138 is extended from two ends of the secondary coil 132.

Figure 4A:
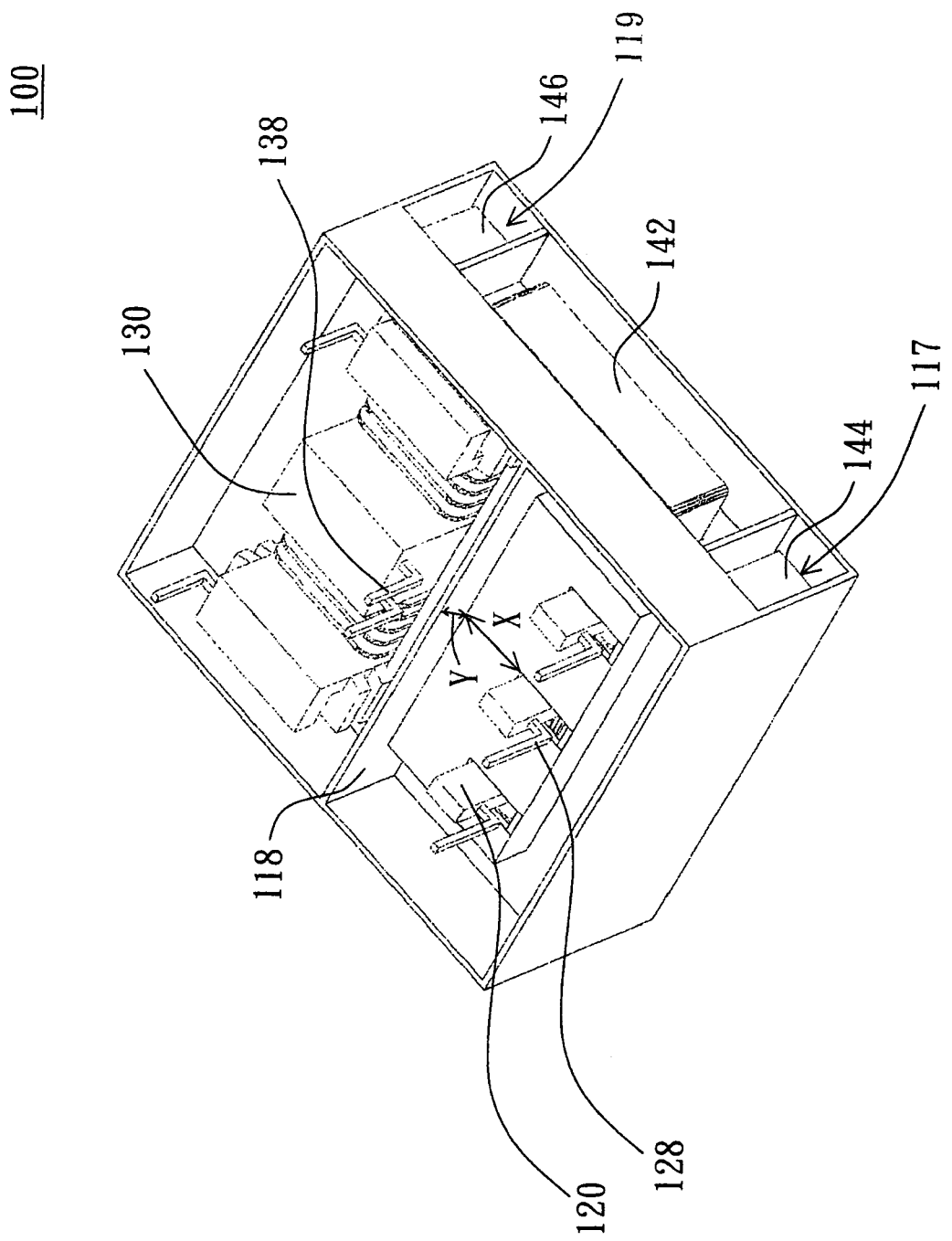
FIG. 4A is an upward 3-D assembly diagram of the transformer of FIG. 2.

During assembly, the first bobbin 120 is disposed on the first chamber 112, and the second bobbin is disposed on the second chamber 114. The first core 140 is inserted to the first through hole 126 and the second through hole 136. The second core 142 is coupled to and forms a magnetic loop with the first core 140. Referring to FIG. 4A, an upward 3-D assembly diagram of the transformer of FIG. 2 is shown. The first pin set 128 is correspondingly protruded from the aperture 116, and the second pin set 138 is correspondingly protruded from the aperture of the second chamber 114 as shown in FIG. 4A. Thus, the creeping distance between the first pin set and the second pin set is composed of the distance X from the aperture 116 to the divider 118 and the height Y of the divider. In the conventional transformer, both the primary coil and the secondary coil are surrounded on the same bobbin, such that the creeping distance between two pin sets is very small. In the present embodiment of the invention, the creeping distance between the first pin set 128 of the primary coil 122 and the second pin set 138 of the secondary coil 132 equals X+Y, hence the safety insulation distance between the first pin set 128 and the second pin set 138 is largely increased.

Figure 4B:
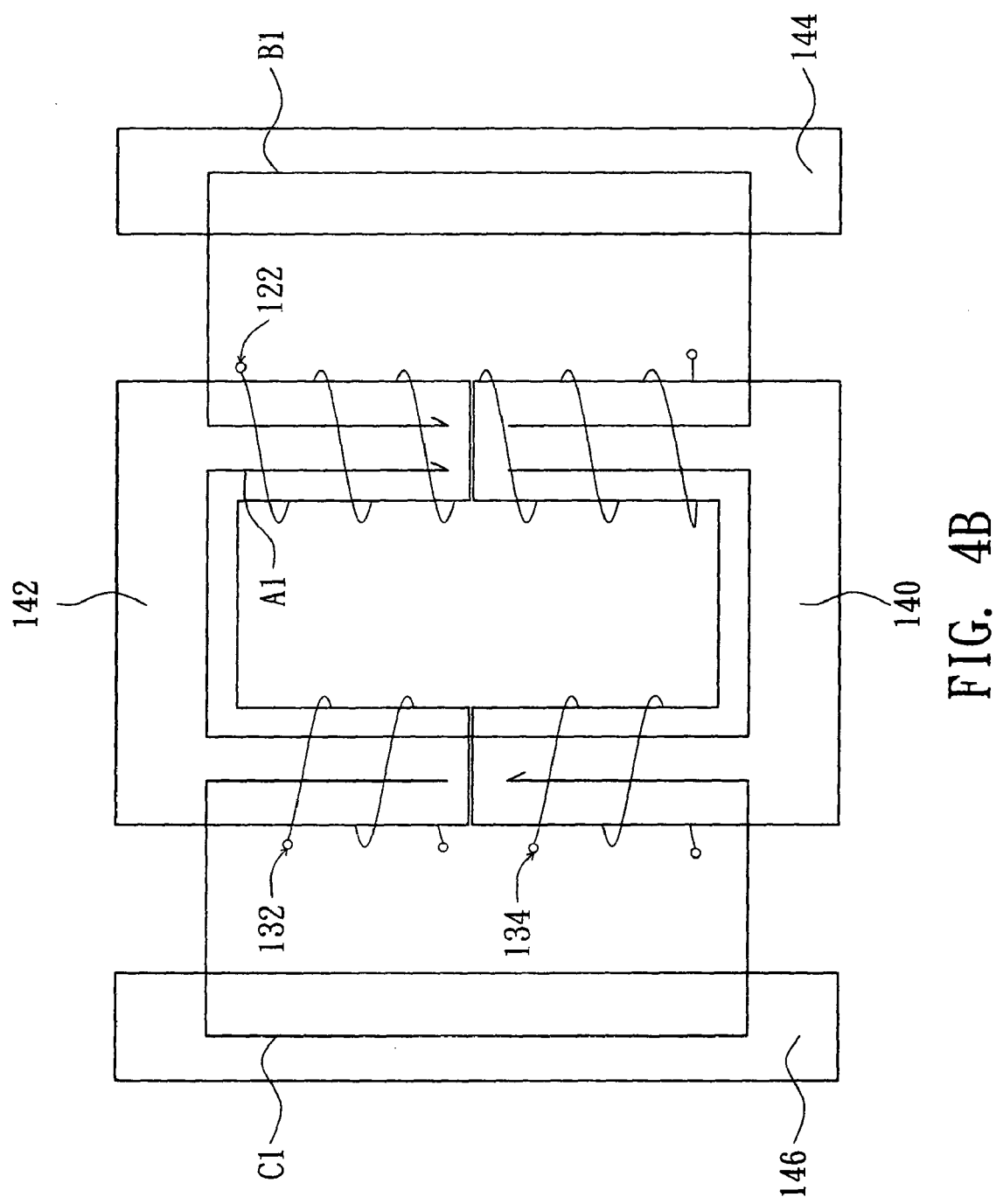
FIG. 4B is a magnetic line of the transformer of FIG. 4A.

Referring to FIG. 2, the transformer 100 further includes a first external magnetic element 144 and a second external magnetic element 146. Referring to FIG. 4A, during the assembly of the transformer 100, the first external magnetic element 144 is disposed next to the first bobbin 120 and is preferably received in the fourth chamber 117, while the second external magnetic element 146 is disposed next to the second bobbin 130 and is preferably received in the third chamber 119. Referring to FIG. 4B, a magnetic line of the transformer of FIG. 4A is shown. When the current flows to the primary coil 122, the secondary coil set 132 generates an induced current. Meanwhile, the primary coil set 122 generates a magnetic flux on the path of the current, and the magnetic line formed by the magnetic flux is shown in FIG. 4B. The magnetic line starts from the primary coil set 122, passes through the first core 140 and the second core 142, and extends to the secondary coil set 132 to form a first magnetic loop A1. The magnetic flux is the main part of magnetic flux (the magnetic flux A1) generated between the primary coil set 122 and the secondary coil set 132. In FIG. 4B, there are a second magnetic loop B1 and a third magnetic loop C1 in addition to the first magnetic loop A1. The second magnetic loop B1 is a part of magnetic flux (the magnetic flux B1) of the primary coil set 122. The third magnetic loop C1 refers to a partial magnetic flux (the magnetic flux C1) generated by the secondary coil set 132. Thus, the total magnetic flux equals A1+B1+C1. Thus, by disposing a magnetic element outside the first bobbin and the second bobbin, the leakage flux outside the coil is induced back, not only reducing electromagnetic interference, but also forming an extra magnetic loop and increasing the total magnetic flux.

Figure 5:
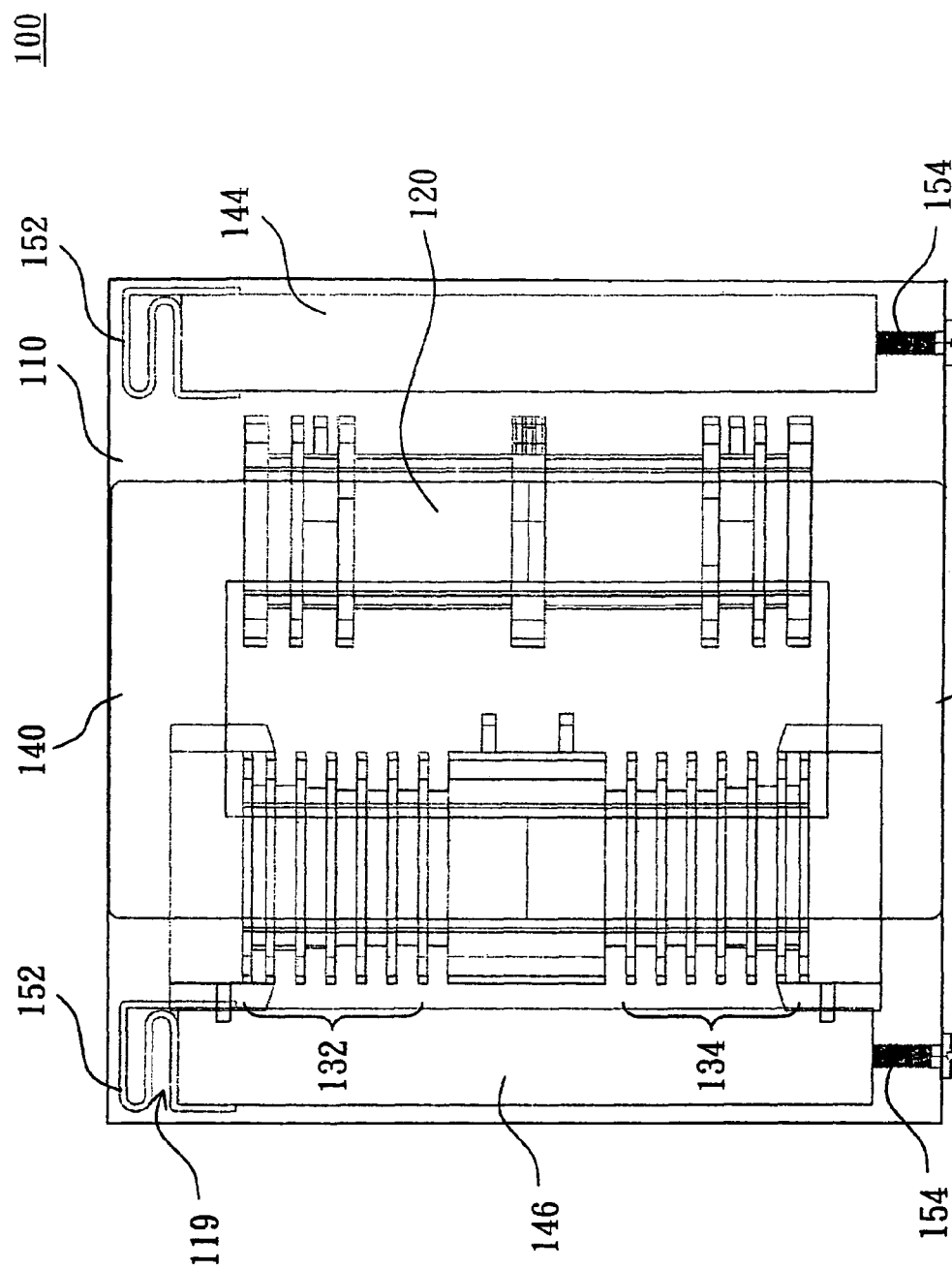
FIG. 5 is a cross-sectional view of the transformer of FIG. 2.

The transformer 100 can further include another secondary coil 134 as shown in FIG. 2. The secondary coil 134 is surrounded on the second bobbin 130 and separated from the secondary coil 132 by a predetermined distance. FIG. 5 is a cross-sectional view of the transformer of FIG. 2. Referring to FIG. 5, the insulating housing 110 further includes a third chamber 119 and a fourth chamber 117. The third chamber 119 is disposed next to the second chamber 114, while the fourth chamber 117 is disposed next to the second chamber 114. The transformer 100 further includes an elastic element 152 and an adjusting element 154. The elastic element 152 is disposed on the insulating housing 110 for pressing one end of the second external magnetic element 146. The adjusting element 154 is disposed on the insulating housing 110 and is positioned on the other end of the second external magnetic element 146. The elastic element 152 and the adjusting element 154 are used for adjusting the relative position of the second external magnetic element 146 with respect to the secondary coil 132 and the another secondary coil 134.

Figure 6:
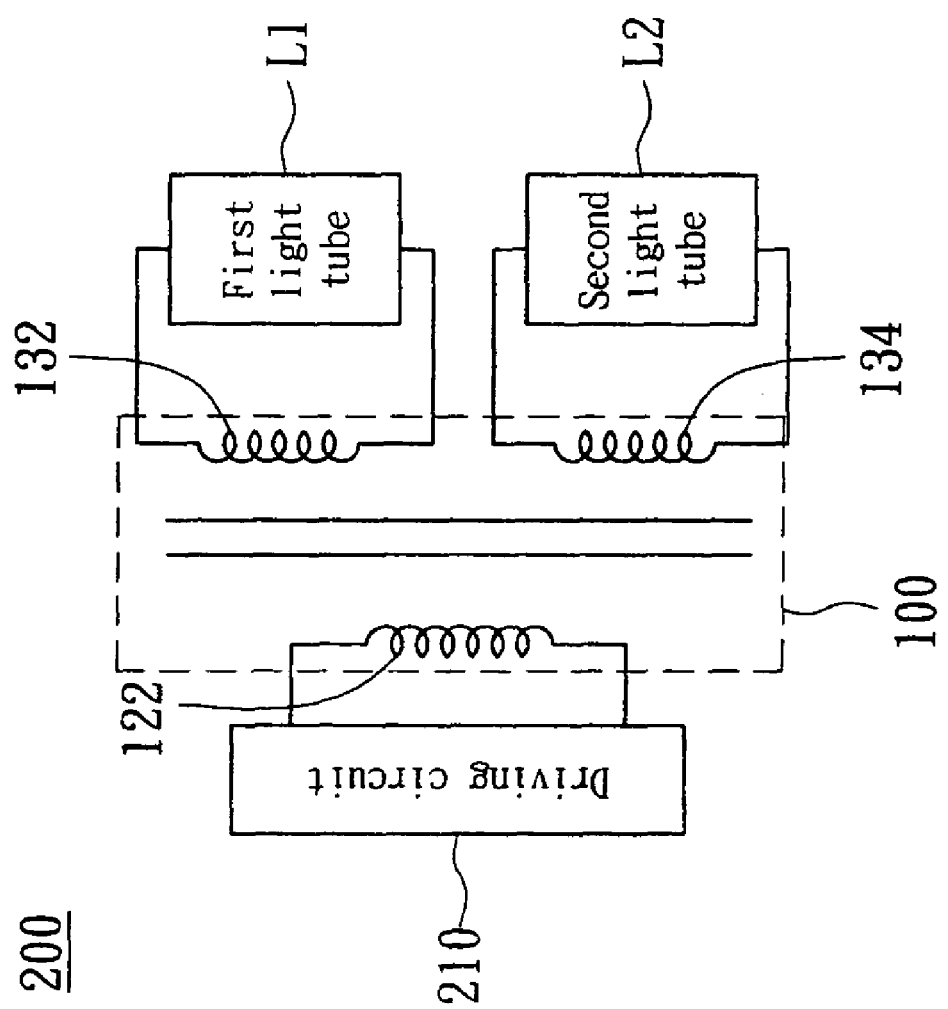
FIG. 6 is the transformer of FIG. 2 applied in a light tube driving device.

The transformer of the present embodiment of the invention is applicable to a light tube driving device. Referring to FIG. 6, the transformer of FIG. 2 applied in a light tube driving device is shown. The light tube driving device 200 includes a driving circuit 210, a first light tube L1 and the transformer 100 disclosed above. The driving circuit 210 is used for outputting an AC voltage. The transformer 100 is used for receiving the AC voltage to drive the first light tube L1. The primary coil 122 of the transformer 100 is surrounded on the first bobbin 120 and is coupled to the driving circuit 210 to receive the AC voltage. The secondary coil 132 of the transformer 100 is surrounded on the second bobbin 130 and is coupled to the first light tube L1 to drive the first light tube L1.

Preferably, the light tube driving device 200 further includes a second light tube L2 and another secondary coil 134. The another secondary coil 134 is surrounded on the second bobbin 130, separated from the secondary coil 132 by a predetermined distance, and coupled to the second light tube L2 to drive the second light tube L2. Though such design, the light tube driving device is able to drive more than one light tube at the same time.

Furthermore, the transformer of the present embodiment of the invention functions to adjust light tube luminance when the transformer is applied to a light tube driving device. The method for adjusting light tube luminance includes the following steps. Firstly, a transformer 100, a first light tube L1 and a second light tube L2 are provided, wherein the first secondary coil 132 of the transformer is surrounded on the second bobbin 130 and is coupled to the first light tube L1, while the second secondary coil 134 of the transformer is surrounded on the second bobbin 130, separated from the first secondary coil 132 by a predetermined distance, and coupled to the second light tube L2. Next, a driving circuit 210 is provided for outputting an AC voltage to drive the first light tube L1 and the second light tube L2. Lastly, the position of the second external magnetic element 146 is adjusted, and both the luminance of the first light tube L1 and the luminance of the second light tube L2 are adjusted according to the position of the second external magnetic element 146. Referring to FIG. 5, if the luminance of the first light tube L1 is larger than the luminance of the second light tube L2, the second external magnetic element 146 is shifted towards the second secondary coil 134. For example, the adjusting element 154 is loosened, so that the elastic element 152 pushes the second external magnetic element 146 towards the second secondary coil 134. As the second external magnetic element 146 approaches the second secondary coil 134, both the inductance and the leakage inductance of the second secondary coil 134 are increased and so is the magnetic flux, such that the induced current passing through the second secondary coil 134 is increased accordingly. Consequently, the luminance of the second light tube L2 is intensified, but the luminance is the first light tube L1 is weakened. Similarly, if L1 the luminance of the first light tube is smaller than the luminance of the second light tube L2, the second external magnetic element 146 is shifted towards the first secondary coil 132. For example, if the adjusting element 154 is tightened, the second external magnetic element 146 which is pressed towards the elastic element 152 moves towards the first secondary coil 132. As the second external magnetic element 146 approaches the first secondary coil 132, both the inductance and the leakage inductance of the first secondary coil 132 are increased, and the intensified magnetic flux increases the induced current passing through the first secondary coil 132. Consequently, the luminance of the first light tube L1 is intensified, but the luminance of the second light tube L2 is weakened. The above principle can also be applied to control the current outputted by the light tube for balancing and uniforming the luminance of two light tubes. When the light tube driving device is used to drive the cold cathode fluorescent lamp of the liquid crystal display, the luminance of the backlight source is uniformed, and the display quality is improved. Furthermore, if the light tube is driven by an adjusted, balanced current, the lifespan of the light tube can be prolonged.

Second Embodiment

The transformer of the present embodiment of the invention differs with the transformer of the above embodiment only in the aperture of the insulating housing, the material of the first external magnetic element and the second external magnetic element, and the disposition of the first pin set and the second pin set. As for other elements, the same reference numbers are used and are not repeated here.

Figure 7:
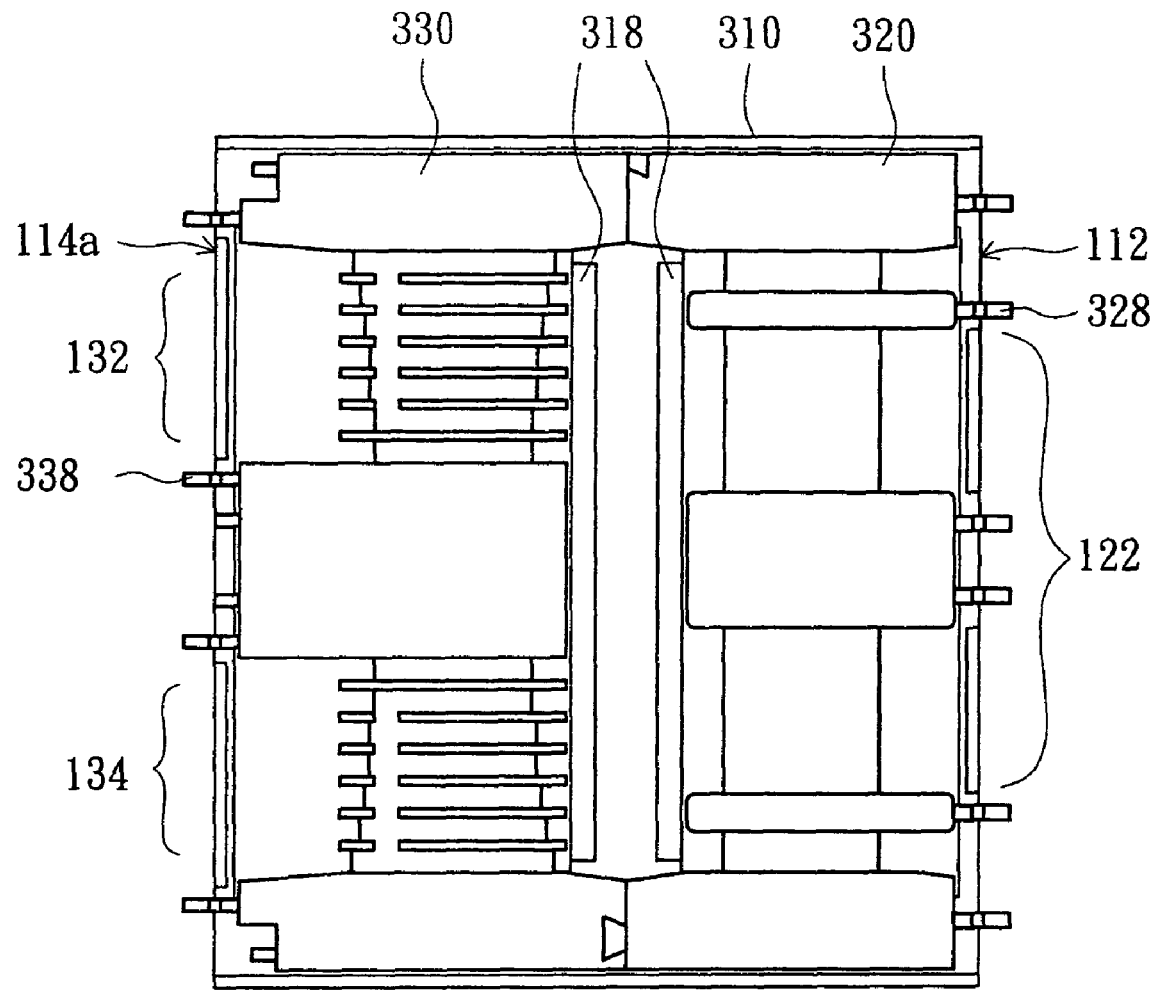
FIG. 7 is a perspective diagram of a transformer according to a second embodiment of the invention.

Referring to FIG. 7, a perspective diagram of a transformer according to a second embodiment of the invention is shown. In the present embodiment of the invention, the insulating housing 310 of the transformer 300 completely covers the first bobbin 320 and the second bobbin 330. However, the top surface of the insulating housing 310 is not illustrated in the diagram. In the transformer 300 of the present embodiment of the invention, there is a divider 318 disposed between the first chamber 312 and the second chamber 314, and the apertures of the first chamber 312 and the second chamber 314 are respectively disposed on the left and the right side-walls of the insulating housing 310. The first pin set 328 is extended from two ends of the primary coil 122, and is protruded from the aperture of the first chamber 112. The second pin set 338 is extended from two ends of the secondary coil 132, and is protruded from the aperture of the second chamber 114. Thus, the creeping distance between the first pin set 328 and the second pin set 338 is approximately equal to the width of the transformer 300, further increasing the safety insulation distance.

Moreover, the transformer of the present embodiment of the invention can further include a first external magnetic element and a second external magnetic element (not illustrated in the diagram) disposed next to the first bobbin and the second bobbin. Preferably, the first external magnetic element and the second external magnetic element are made from manganese-zinc alloy or nickel-zinc alloy. When the nickel-zinc alloy is used, a better resistance is produced (larger than 1M Ohm), and the high voltage spark problem can be avoided.

According to the transformer of light tube driving device disclosed in the above embodiment of the invention, the aperture of the chamber for receiving the bobbin can be disposed on two opposite sides of the insulating housing, such as the top surface vs. the bottom surface or the left side vs. the right side. Consequently, the safety insulation distance of the pin of the coil is maximized, the safety of the transformer is improved, and the scope of application of the transformer is expanded. Moreover, the transformer further includes an external magnetic element to induce back the leakage flux outside the coil, not only reducing the electromagnetic interference, but also increasing total magnetic flux. Moreover, when the transformer of the invention is applied to light tube driving device, the external magnetic element of the transformer can be used to adjust the luminance of the light tube. Particularly, when the transformer is used to drive two light tubes, the external magnetic element can further uniform the luminance of the two light tubes, such that the luminance is uniformed and the lifespan of the light tube is prolonged.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transformer, comprising:
    an insulating housing having a first chamber, and a second chamber separated from the first chamber, wherein each chamber has an aperture, with the apertures being respectively disposed on two opposite side-walls of the insulating housing the insulating housing further comprising a third chamber disposed next to the second chamber;
    a first bobbin having a first through hole and being disposed in the first chamber;
    a primary coil disposed on and surrounding the first bobbin, with the first bobbin being surrounded only by the primary coil;
    a second bobbin having a second through hole and being disposed in the second chamber;
    a secondary coil disposed on and surrounding the second bobbin;
    a first core inserted into the first through hole and the second through hole;
    a second core coupled to the first core, the first core and the second core forming a magnetic loop;
    another secondary coil disposed on and surrounding the second bobbin and separated from the secondary coil by a predetermined distance;
    a first external magnetic element disposed next to the first bobbin;
    a second external magnetic element disposed next to the second bobbin;
    an elastic element disposed on the insulating housing for pressing one end of the second external magnetic element; and
    an adjusting element disposed on the insulating housing, and positioned on the other end of the second external magnetic element;
    wherein the elastic element and the adjusting element are used for adjusting the relative position of the second external magnetic element with respect to the secondary coil and the another secondary coil; and
    wherein the primary coil and the secondary coil are wound around the first and the second bobbins respectively and are disposed in the first and the second chambers respectively, so that the primary coil and the secondary coil are separated by the insulating housing.

2. The transformer according to claim 1, wherein a bottom surface of the insulating housing has a further aperture leading into the first chamber and being disposed on a same side of the insulating housing as the aperture of the second chamber.

3. The transformer according to claim 2 further comprising:
    a first pin set extended from two ends of the primary coil and protruded from the further aperture; and
    a second pin set extended from two ends of the secondary coil and protruded from the aperture of the second chamber so that the first and second pin sets are separated by a creeping distance between the further aperture and the aperture of the second chamber.

4. The transformer according to claim 2, wherein the first chamber and the second chamber are separated from each other, the insulating housing further comprising:
    a divider extended from the insulating housing disposed between the first chamber and the second chamber.

5. The transformer according to claim 4, wherein the apertures of the first and second chambers are disposed away from the divider.

6. The transformer according to claim 1, wherein the aperture of the first chamber is positioned at a left side of the insulating housing, the aperture of the second chamber is positioned at a right side of the insulating housing, the transformer further comprising:
    a first pin set extended from two ends of the primary coil and protruded from the aperture of the first chamber; and
    a second pin set extended from two ends of the secondary coil and protruded from the aperture of the second chamber;
    wherein the first and second pin sets are protruded in opposite directions so as to be separated by the width of the insulating housing.

* * * * *